Figure 13A:
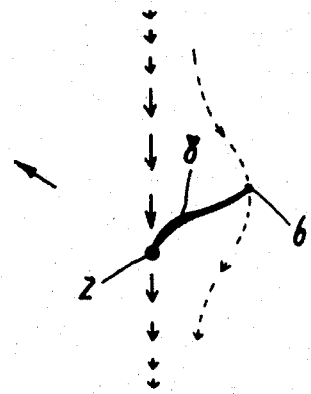

May 23, 1967 YOSHIYUKI OGURI 3,321,022
ROTARY WING ASSEMBLY
Filed Oct. 14, 1964 15 Sheets-Sheet 1
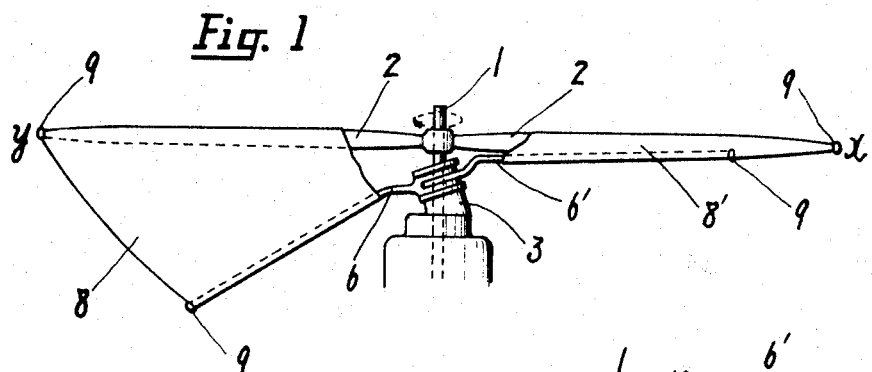
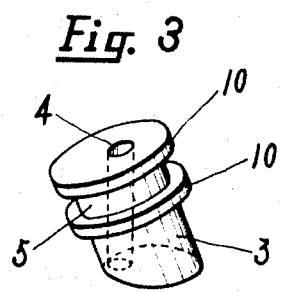
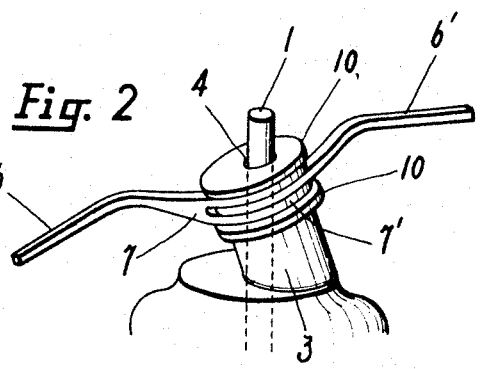
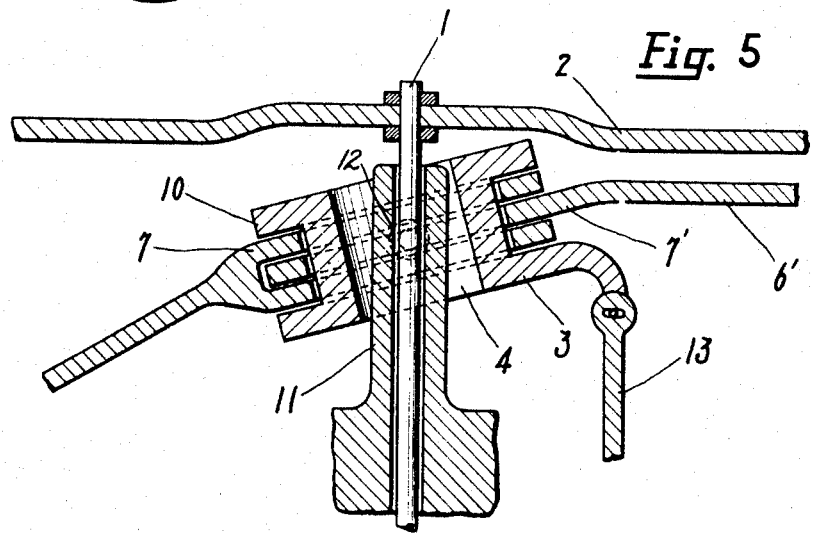
INVENTOR
YOSHIYUKI OGURI
BY Toulmin & Toulmin
ATTORNEYS

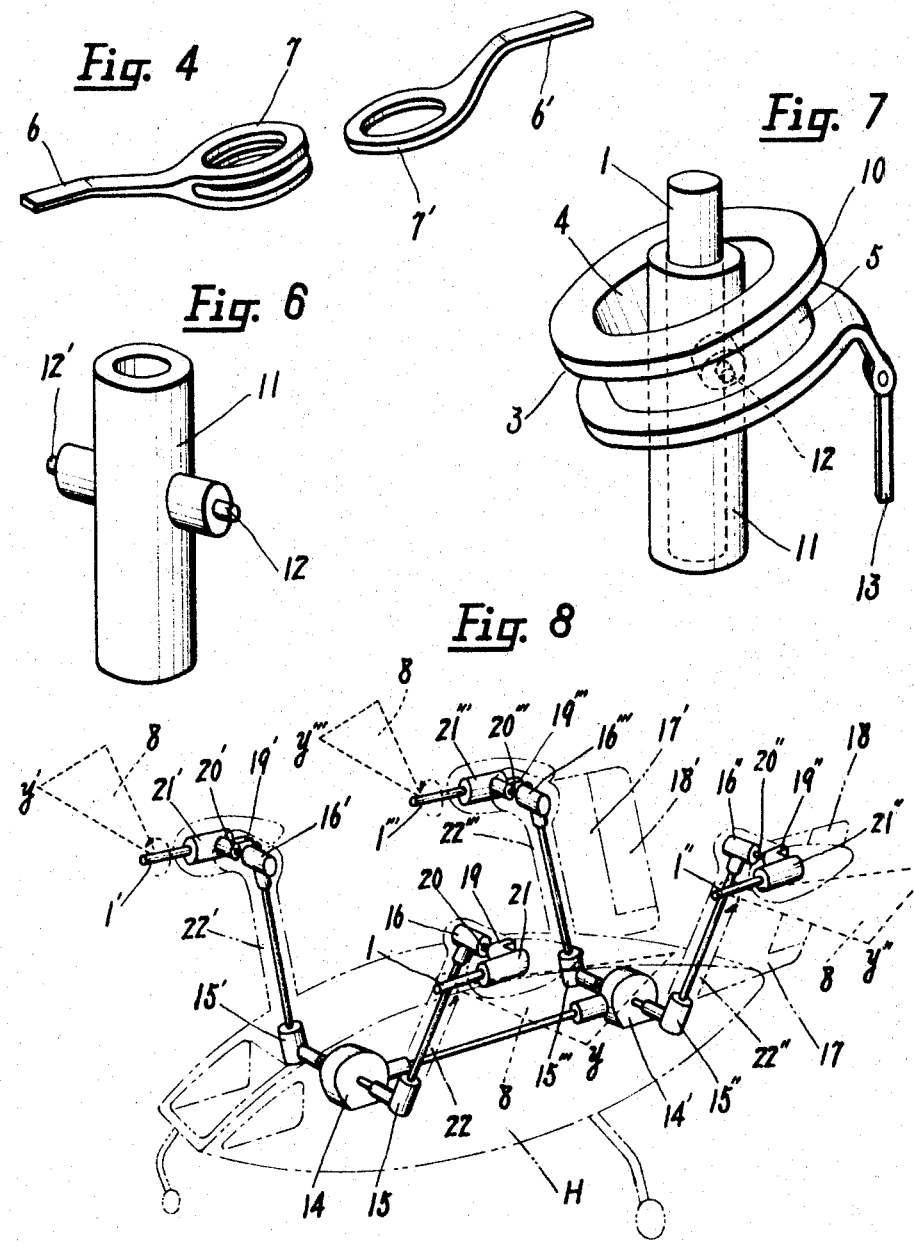

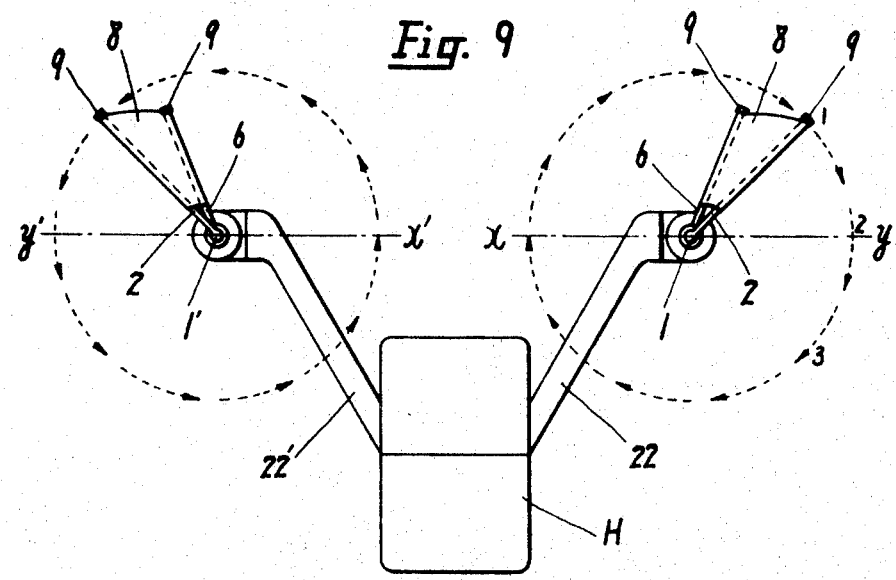
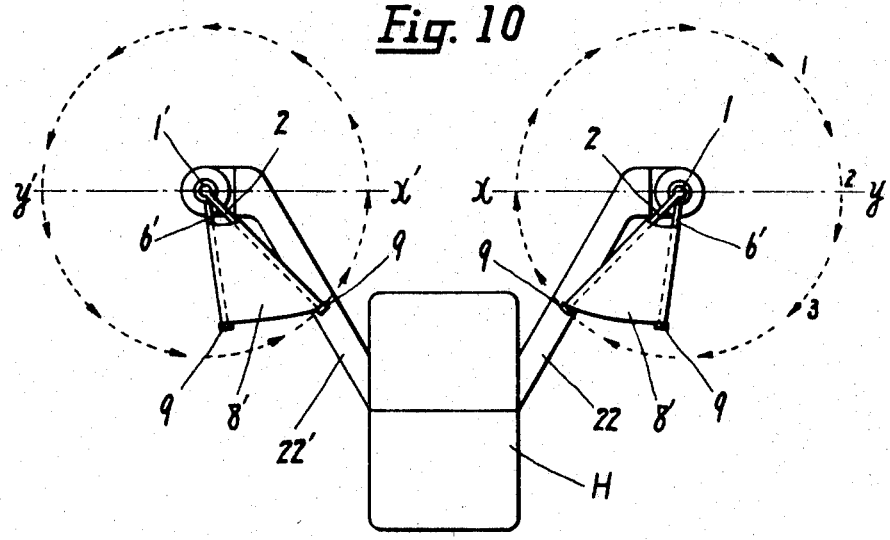

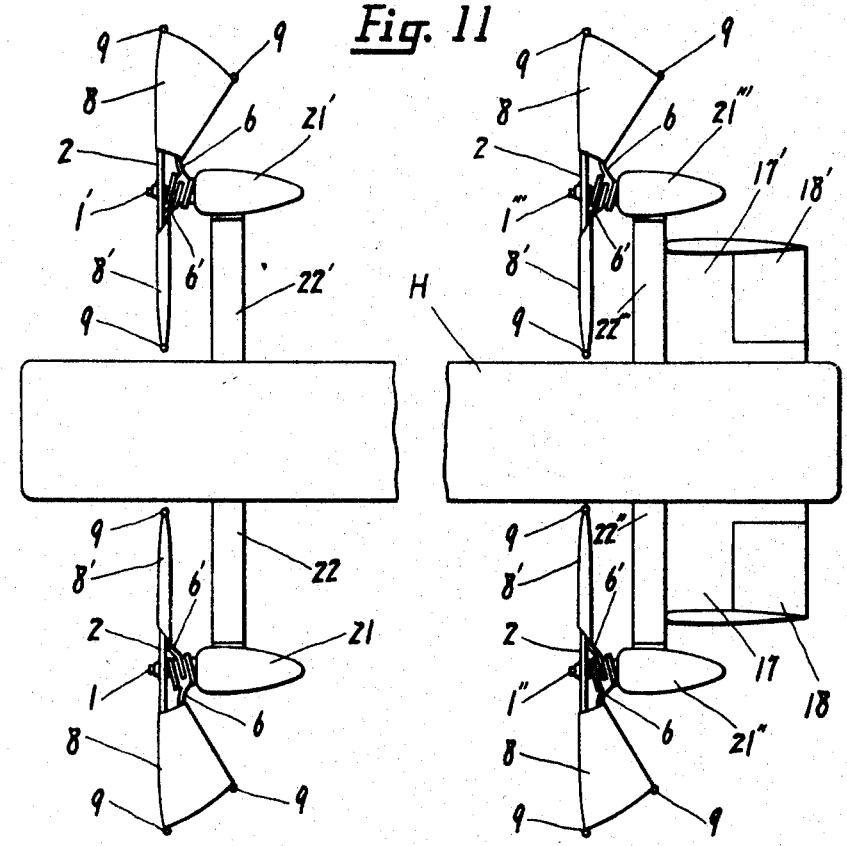

May 23, 1967  YOSHIYUKI OGURI  3,321,022
ROTARY WING ASSEMBLY
Filed Oct. 14, 1964  15 Sheets-Sheet 5

INVENTOR
YOSHIYUKI OGURI
BY Toulmin & Toulmin
ATTORNEYS

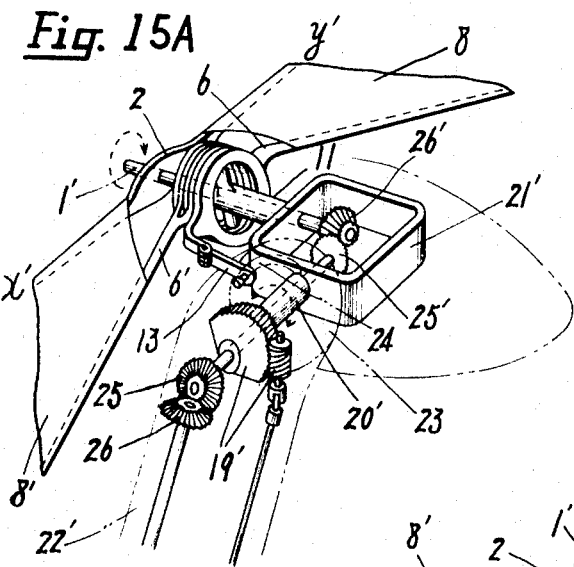
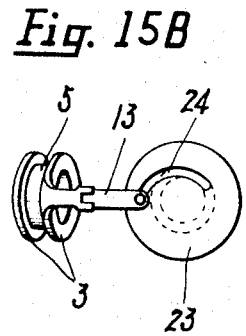
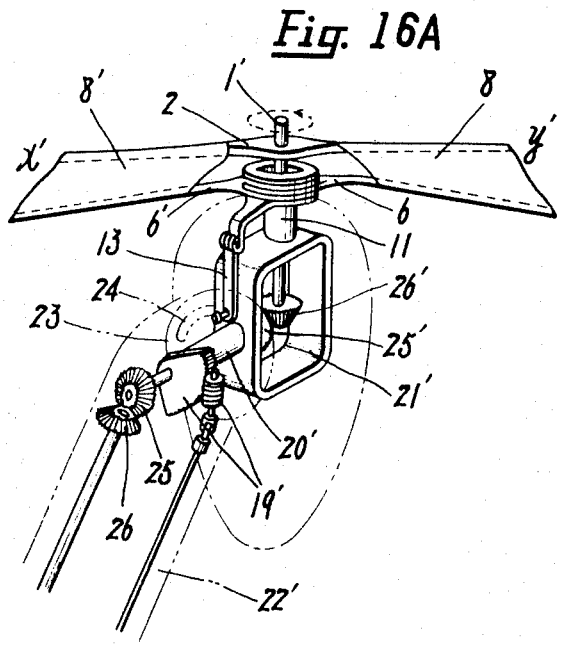
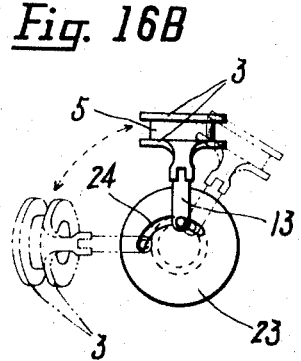

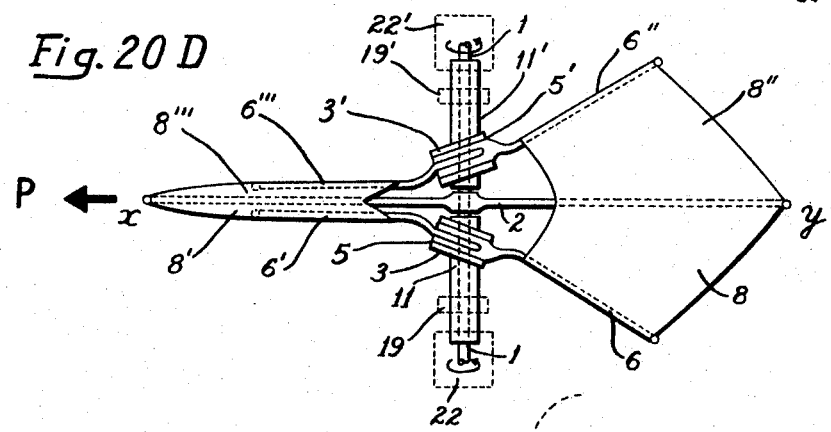
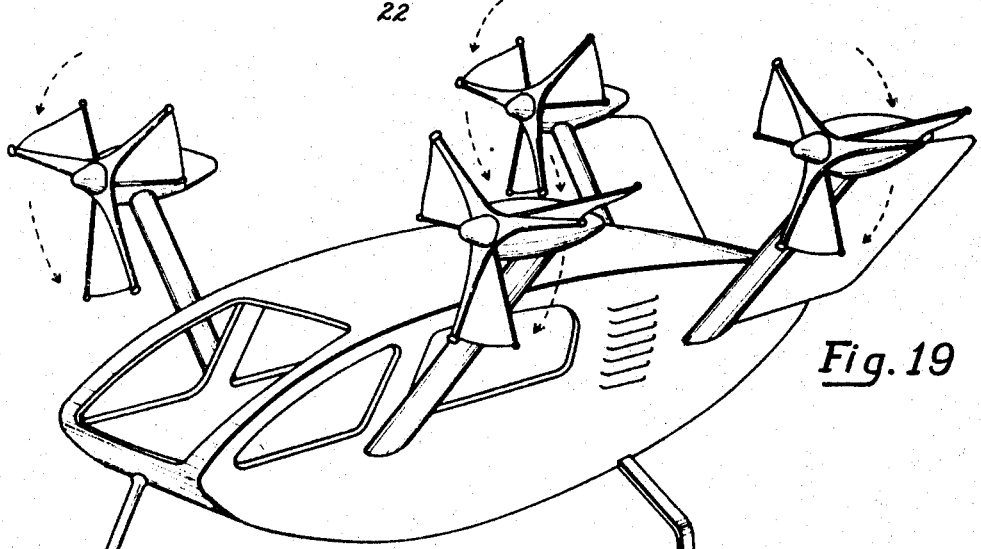
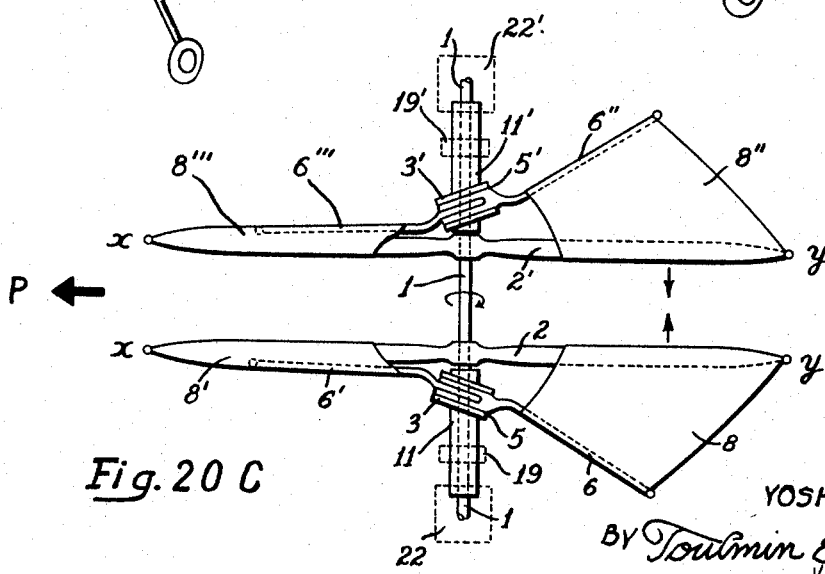

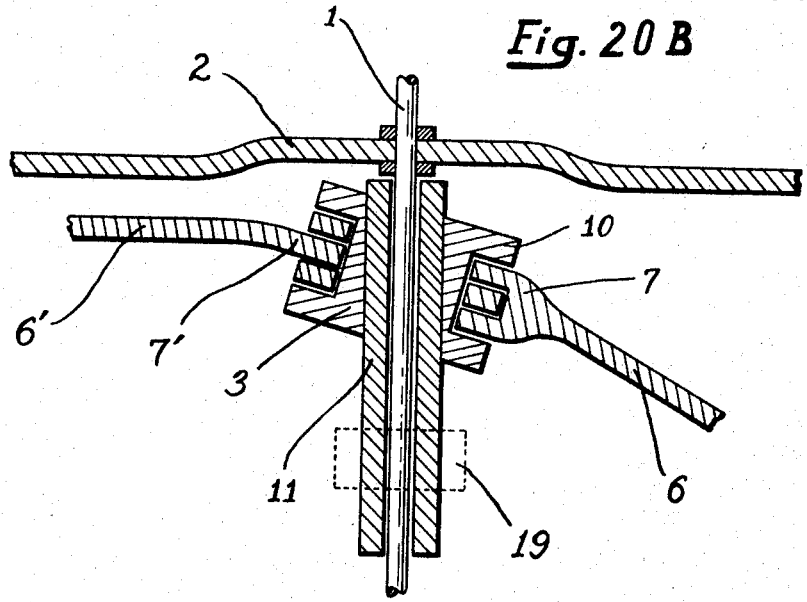
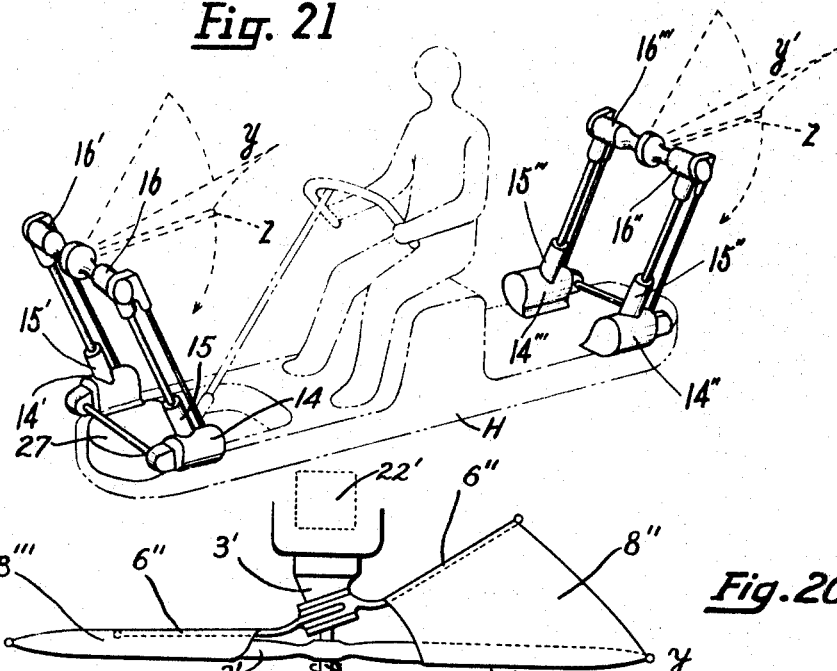
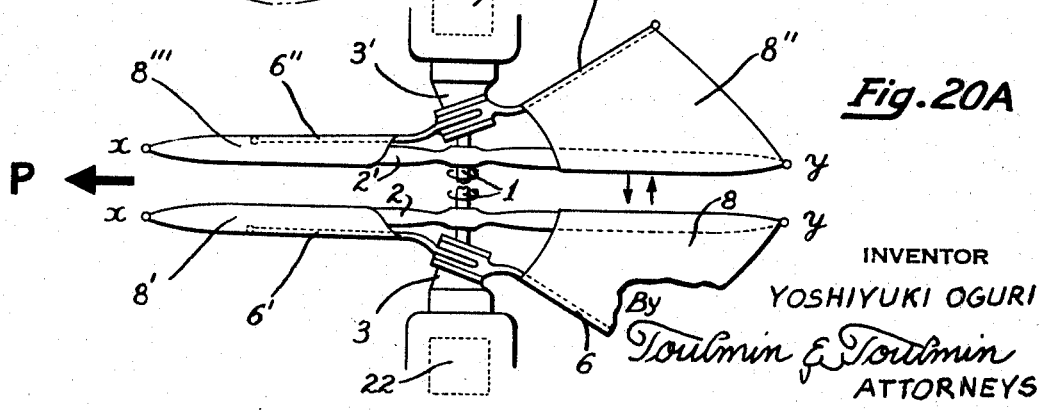

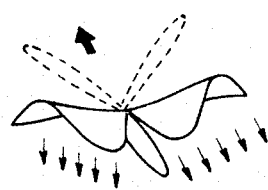
Fig. 24A
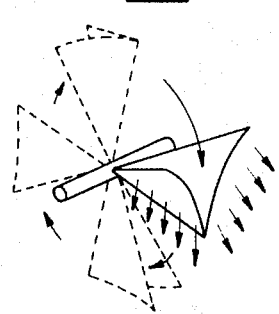
Fig. 24B
Fig. 24C
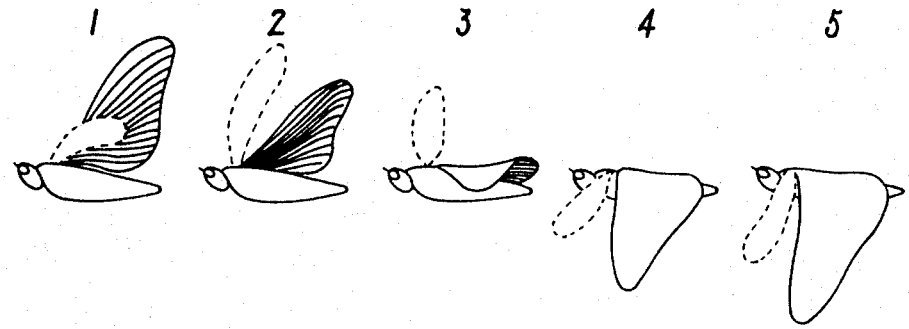
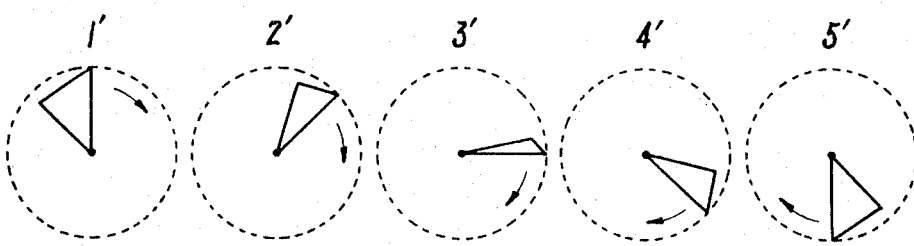
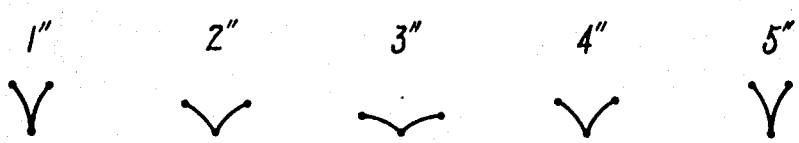

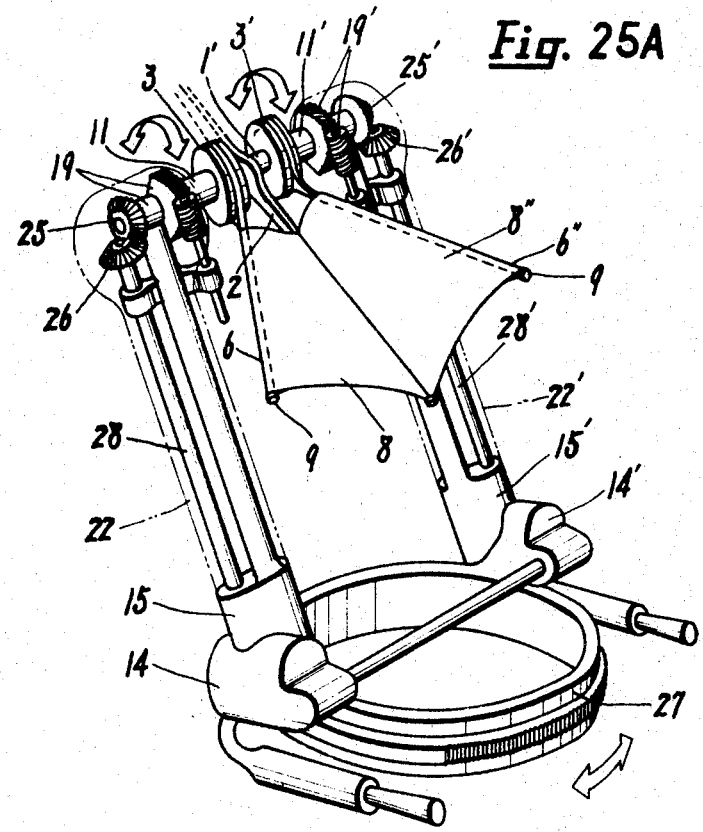
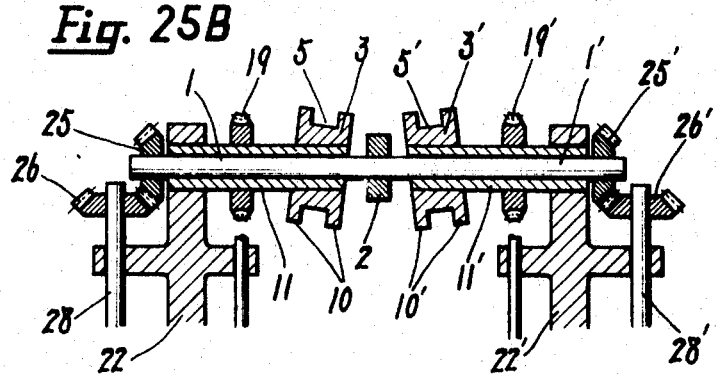

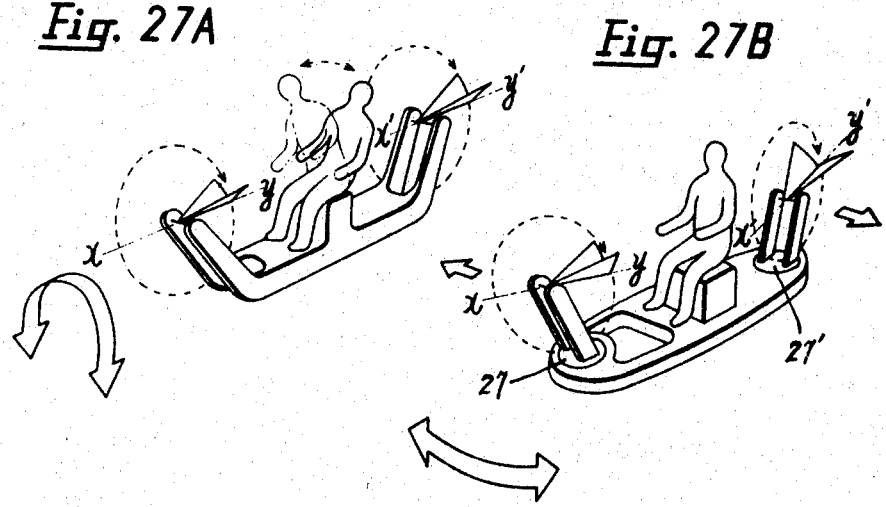

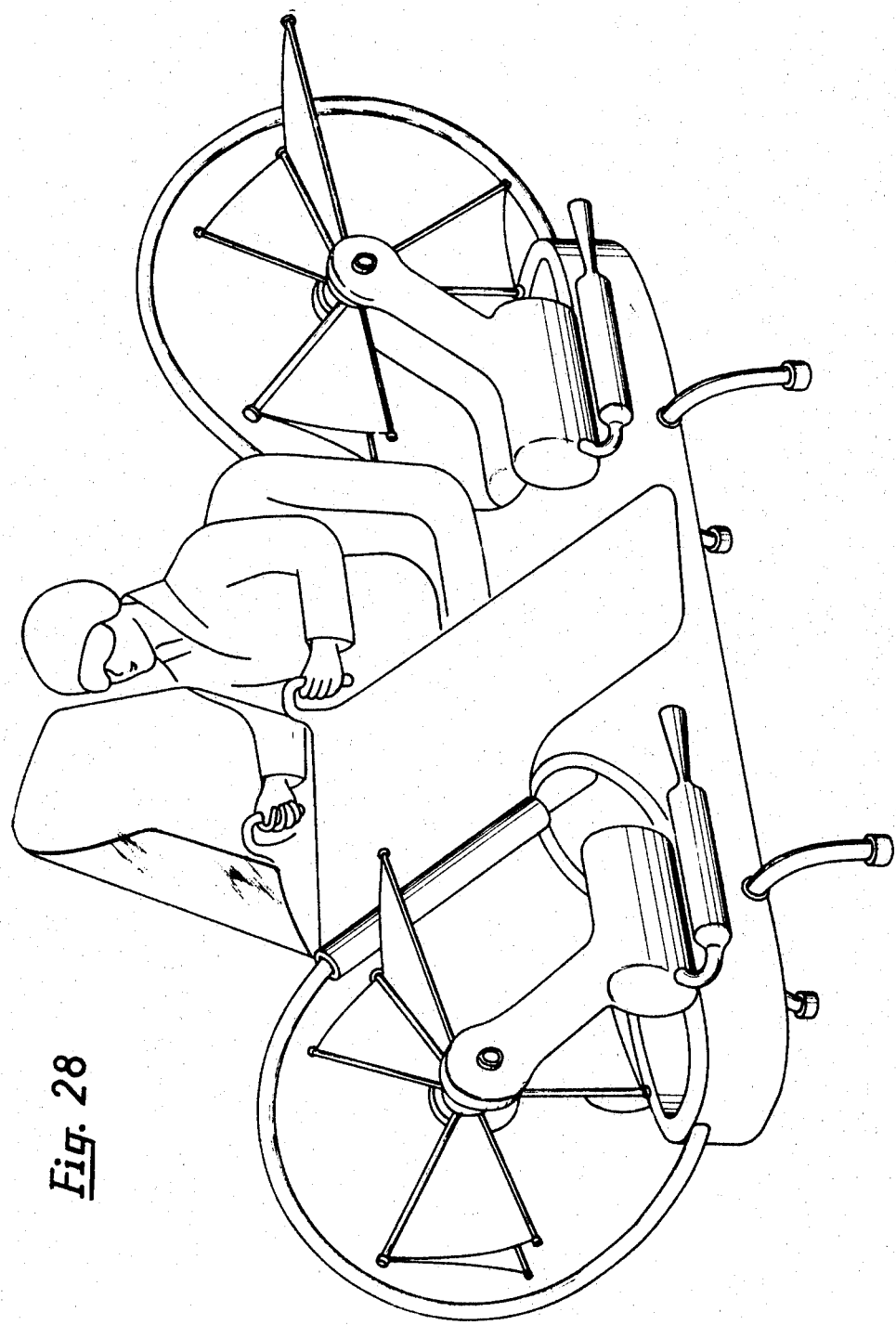

United States Patent Office 3,321,022
Patented May 23, 1967

3,321,022
ROTARY WING ASSEMBLY
Yoshiyuki Oguri, 7 gou, 9 banchi, 7-chome Minami
Aoyama, Minato-ku, Tokyo-to, Japan
Filed Oct. 14, 1964, Ser. No. 403,771
Claims priority, application Japan, Oct. 25, 1963,
38/57,039
11 Claims. (Cl. 170—160.25)

The present invention relates in general to a rotary wing assembly for floating and driving airborne vehicles, and more particularly to a novel improved rotary wing assembly in which a wing may be rotated at an increased speed resulting in an improved floating and driving effect.

It is difficult to artificially simulate the flapping motion of an insect exactly in the same manner, because the mechanism therefore becomes complex and because a sufficiently high speed of flapping motion to generate bouyancy cannot be realized. In the prior art, a method has been contemplated for a continuously driving operation of a rotary wing assembly corresponding to the upward and downward flapping motion of wings of an insect for each period of rotation of the rotary wing when the wing surface is rotated in a predetermined direction while the tilting angle of the wing surface is varied in such manner that on one side where the wing surface swings from up to down it fans the air and on the other side where the wing surface swings from down to up its resistance to the air is reduced.

However, even according to the above-referred method, since the variation of the tilting angle of the wing surface was achieved by means of a rod coupled to a rotary shaft or a cam outside of the rotary shaft, or by means of special gears and the like, a reaction effect was exerted by the cam upon the periodic operation for varying the tilting angle of the wing surface during high speed rotation of the rotary wing, many unreasonable points existing in the mechanism for varying the tilting angle of a wing which is wide enough for a substantial amount of air, and thus the rotational speed of the wing could not be raised, so that the floating and advancing effect as per the above-referred method was not satisfactory.

Now if the operation of the rotary wing assembly, is not accompanied by such a reaction effect, and if the mechanism is such that it can vary the tilting angle of a wide wing in a reasonable manner, it is naturally possible to raise the rotation speed of the wing and to generate an ample floating and advancing effect. The present invention has been completed as a result of laborious research work, in respect to the above-mentioned points.

Therefore, one object of the present invention is to provide a novel improved rotary wing assembly in which, during its high speed rotation in a predetermined direction, a rotary wing takes one tilting attitude that is the most preferable for fanning out the air in a downward and backward direction at one side where it swings from up to down, whereas it takes another tilting attitude that shows a reduced resistance to the air at the other side where it swings from down to up, without being accompained with the above-mentioned disadvantageous reaction effect.

According to one feature of the present invention, there is provided to a rotary wing assembly comprising a principal rotary shaft, a rigid and thin rotary tractive rod mounted on said principal rotary shaft, a wide tent-like wing surface to be rotated following said rotary tractive rod, and tilting angle regulating rods for said following wing.

Figure 13B:
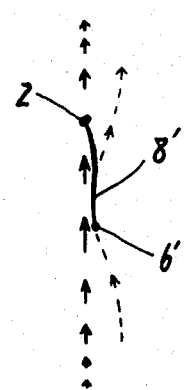
Figure 13C:
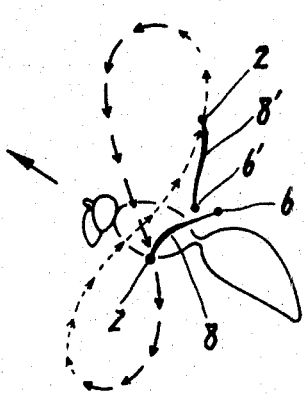
Figure 17A:
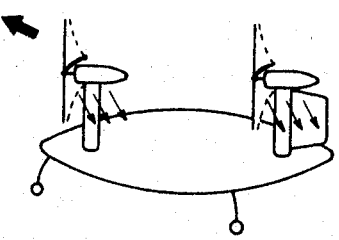
Figure 17B:
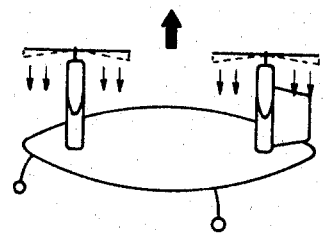
Figure 17C:
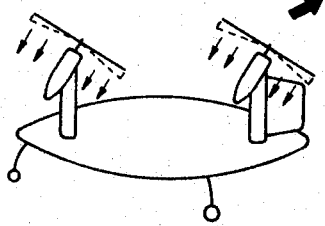
Figure 18A:
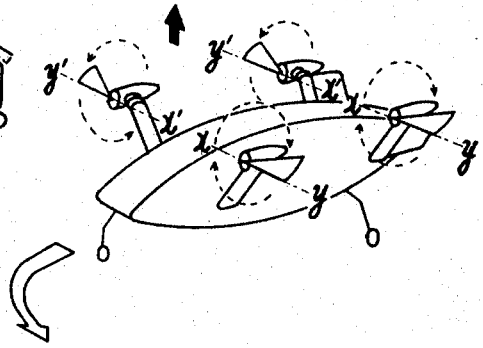
Figure 18B:
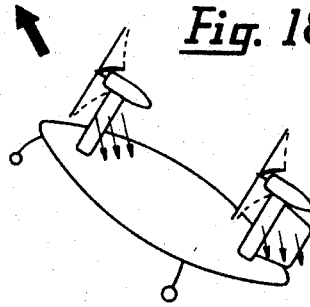
Figure 18C:
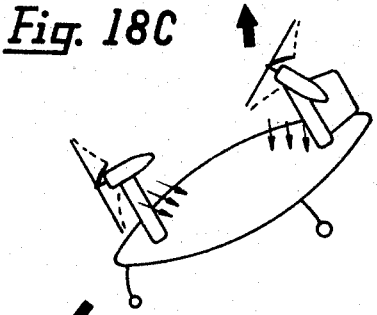

The above and other objects and features of the present invention will become more apparent from perusal of the following description taken in conjunction with the accompanying drawings, in which FIG. 1 is a plan view of an idle wing assembly in which rotary following rods rotate in accordance with a rotary tractive rod, FIG. 2 is a perspective view of a rotating mechanism portion of said rotary wing assembly, FIG. 3 is a perspective view of a bearing body for the idle following rods, FIG. 4 is a perspective view illustrating one example of a pair of bearing rings for the idle following rods, FIG. 5 is a partly enlarged cross-section view of an idle wing assembly in which the bearing body of the idle following rods is provided with tilting angle regulating means, FIG. 6 is a perspective view of a bearing tube on which is mounted the bearing body for the idle following rods, FIG. 7 is a perspective view of said bearing tube with the bearing body for the idle following rods mounted thereon, FIG. 8 is a perspective view illustrating a power transmission system when the above-mentioned mono-wing type of rotary wing assembly according to the present invention is equipped on an airborne vehicle, FIG. 9 is a diagrammatic front view of said mono-wing type of rotary wing assembly when it is equipped on an airborne vehicle with the above-mentioned power transmission system for explaining the operation upon flapping down the wing, FIG. 10 is a similar diagrammatic front view for explaining the operation upon flapping up the wings, FIG. 11 is a plan view of the airborne vehicle in FIG. 10, FIGURES 12A and 12B are perspective views for comparing a flapping down operation of the wings of a bee with a flapping down operation of the mono-wing type of rotary wing assembly when two such assemblies are rotated in opposite directions, FIGURES 13A, 13B, 13C are side views for comparing the operations of FIGURES 12A and B described above, FIG. 14 shows a body-support mounting angle regulating device of the mono-wing type of rotary wing assembly, FIG. 15A is a diagrammatic view for explaining the operation of said rotary wing assembly when it takes its forward attitude, FIG. 15B shows a tilting angle regulating lever and cam means for the bearing body of the idle following rod, FIG. 16A is a diagrammatic view for explaining the operation of the rotary wing assembly when it takes its upward attitude, FIG. 16B is a diagrammatic view for explaining the coupling operation between the tilting angle regulating lever and cam means for the bearing body of the idle following rod when the assembly tilts backwardly from its upward attitude, FIG. 17A is a view showing forward flight of a airborne vehicle equipped with the mono-wing type of rotary wing assemblies in an opposite relation, FIG. 17B is a view showing upward flight of the same airborne vehicle, FIG. 17C is a view showing backward flight of the same airborne vehicle, FIG. 18A is a view showing quick turn of a flight direction of said airborne vehicle, FIG. 18B is a view showing quick upward flight of the same airborne vehicle, FIG. 18C is a view showing quick downward flight of the same airborne vehicle, FIG. 19 is a perspective view of an airborne vehicle which employs the mono-wing type of rotary wing assemblies in the form of a rotary wing assembly having a triple wing, FIGURE 20A is a plan view illustrating an arrangement in the case of utilizing mono-wing type of rotary assemblies shown in FIGURE 1 in an opposed relation;

FIGURE 20B is a cross-sectional view of a mechanism required in the case of utilizing mono-wing type of rotary wing assemblies shown in each of FIGURES 20C and 20D, in an opposed relation, that is, for constructing the twin type of rotary wing assembly; and FIGURES 20C and 20D respectively show a plan view of a twin type of rotary wing assembly.

Figure 22A:
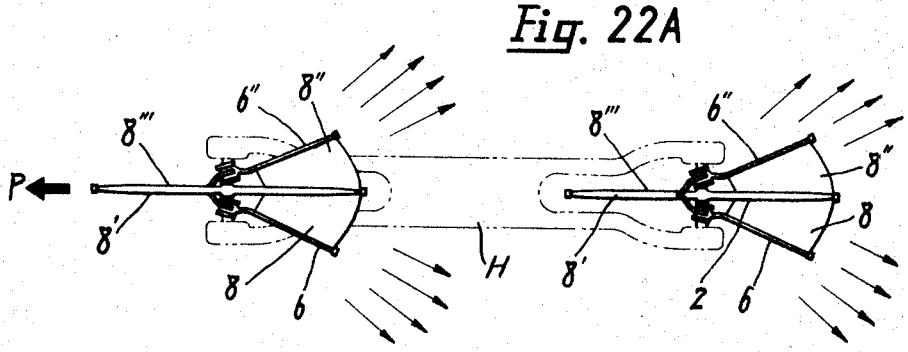
Figure 22B:
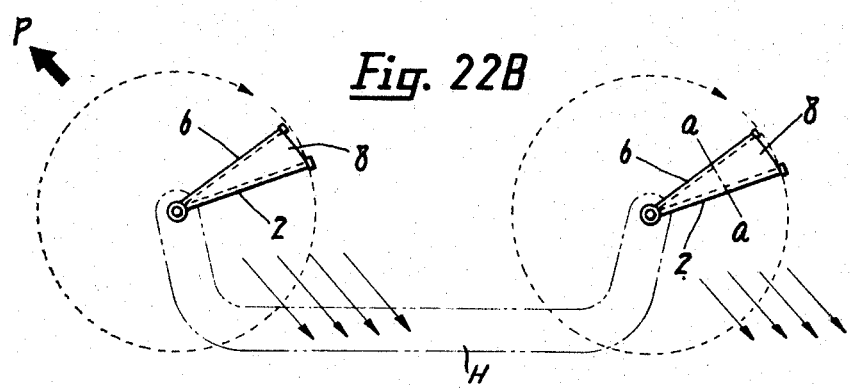
Figure 23:
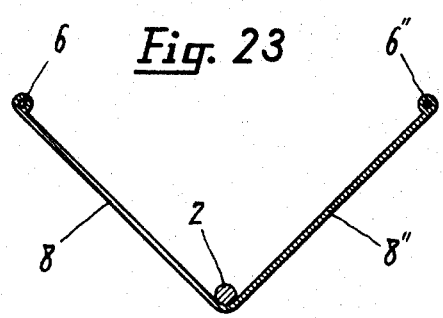
Figure 26A:
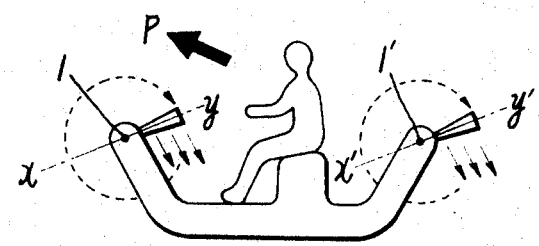
Figure 26B:
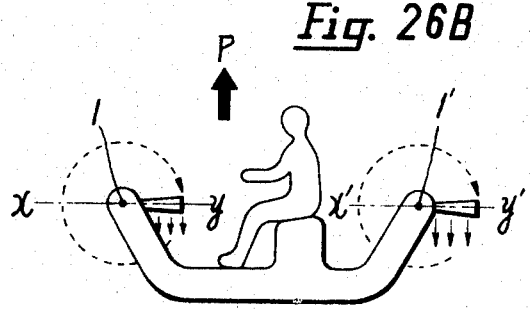
Figure 26C:
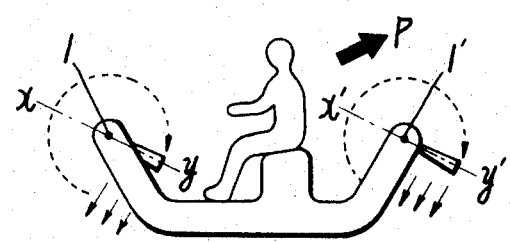

FIG. 21 is a perspective view illustrating one embodiment wherein said twin type of rotary wing assemblies are equipped on the airborne vehicle body one behind the other in a vertically cascaded relation, FIG. 22A is a plan view of an airborne vehicle equipped with twin type of rotary wing assemblies as shown in FIG. 21 for illustrating the operation of said rotary wing assembly, FIG. 22B is a side view of the airborne vehicle in FIG. 22A for illustrating the operation of the rotary wing assembly under the same state, FIG. 23 is a longitudinal section view of the rotary wing assembly in FIG. 22B taken along the line $a$—$a$, FIGS. 24A and 24B are perspective views for comparing the flapping down operation of the wings of a grasshopper and the flapping down operation of a wings of the symmetric type of rotary wing assembly, FIG. 24C is a side view for comparing the expanding and folding variations between the above-described both wings, FIG. 25A is a perspective view of a twin type of rotary wing assembly in which the base bearing tubes of the bearing bodies for the idle following rods are rotatably supported from extreme end portions of twin supports having an annular vehicle body coupling device at their base end portions, FIG. 25B is a cross-section view of a wing rotating mechanism portion in FIG. 25A, FIG. 26A is a view showing forward flight of an airborne vehicle equipped with a twin type of rotary wing assembly having the above-described mechanism, FIG. 26B is a view showing upward flight of the same airborne vehicle, FIG. 26C is a view showing backward flight of the same airborne vehicle, FIGS. 27A, 27B, 27C and 27D are views showing the method for driving the same airborne vehicle along the direction of three axes when it rests in the air, FIG. 27A showing the method for controlling the rolling of the airborne vehicle, FIG. 27B showing the method for controlling the yawing of the airborne vehicle, and FIGS. 27C and 27D showing the method for controlling the pitching of the airborne vehicle, and FIG. 28 is a perspective view of an airborne vehicle which employs the twin type of rotary wing assembly in the form of a rotary wing assembly having a triple wing.

Referring now to the drawings, in FIGS. 1 to 4 a principal rotary shaft is indicated at 1, and to its tip portion is fixedly secured a center portion of a rotary tractive rod 3. At 3 is shown an annularly recessed tilted bearing body having a perfect circular periphery rather than being a cam and having its bore portion 4 extended through by said principal rotary shaft 1, and around an annular recess portion 5 of said annularly recessed tilted bearing body 3 is rotatably fitted, fitting rings 7, 7' having idle following rods 6, 6' which are formed at a certain angle of sweepback with respect to the center line of said tilted bearing body 3, so that a revolution surface of a tilted flat circular cone for the idle following rods 6, 6' may be formed in contrast to a plane revolution surface of the rotary tractive rods. At 8, 8' are shown tent-like wing surfaces of any suitable material which are stretched between said idle tractive rod 2 and said rotary following rods 6, 6', respectively. At 9 is indicated a stopper ring for preventing the stretching portion of said tent-like wing surface from slipping out, and flanges forming the annular recess portion 5 of the annularly recessed tilted bearing body 3 for preventing the idle following rods 6, 6' from slipping out are shown at 10. At this state, when the principal rotary shaft 1 is rotated in the direction shown by a dotted arrow, in accordance with the idle following rods 6, 6' follow the edge portion of the tent-like wing surfaces 8, 8' stretched from and drawin by the rotary tractive rod 2. However, at this time, since no torque is exerted upon the idle following rods 6, 6' themselves, they serve to keep the tent-like wing surfaces 8, 8' in tension and also to maintain the mutual distance between the rotary tractive rod 2 and the idle following rods 6, 6' during rotation substantially constant. In addition in this case, the revolution surface of flat circular cone shape of said idle following rods 6, 6' is so limited that it tilts with respect to the revolution surface of the rotary tractive rod 2 due to the function of the tilted annular recess portion of the annularly recessed tilted bearing body 3, and consequently the pitch of the tent-like wing surfaces 8, 8' takes a tilting state along the revolution surface of the rotary tractive rod 2 on the $x$-side where both revolution surfaces approach each other, while it takes the most tilted state with respect to the revolution surface of the rotary tractive rod 2 on the $y$-side where both revolution surfaces depart from each other.

Therefore, if these states are observed from the $y$-direction shown in FIGURE 1, the tent-like wing surface 8 is caused to flap down with the forwardly tilted attitude, as shown in FIGURE 13A, and the air is forced in the obliquely backward and downward direction by said forwardly tilted tent-like wing surface 8. Then the rotary wing assembly flies in the obliquely forward and upward direction due to the reaction effect. On the other hand, the tent-like wing surface 8' on the $x$-side is caused to flap up with the least aero-resistive attitude, as shown in FIGURE 13B, and thereby the buoyancy obtained by the flapping down of the tent-like wing surface on the $y$-side is not reduced at all.

In this connection, if the rotary tractive rod 2 is made in a thin propeller-shape having a small pitch, and also if rotatable pipes are mounted at the rear portion of the rotary tractive rod and at the idle following rods 6, 6' and the tent-like wing surface 8, 8' are stretched between these pipes, the coupling portion of said wing surface to the rods 2, 6 and 2', 6' becomes hinge means, and therefore the periodic tilting angle variation of the tent-like wing surface 8, 8' may be achieved smoothly even during any high speed rotation, thereby the coupling portions of the tent-like wing surfaces 8, 8' to the respective rods 2, 6 and 2', 6' are not damaged, as is otherwise expected.

Now if the above-described rotary wing assemblies in which the rotary following rods are rotated in accordance with the rotary tractive rod (hereinafter referred to merely as a mono-wing type of rotary wing assembly) are symmetrically equipped on both sides and both in the front and back portion of the airborne vehicle body H as shown in FIGS. 8 to 11, when two prime motors 14, 14' in the power transmission system in FIG. 8 are rotated, the torques caused by said prime motors are transmitted to the principal rotary shafts 1, 1', 1'' and 1''' of the respective mono-wing type of rotary wing assembly by the intermediary of gear boxes containing speed change gears 15, 15', 15'', 15''' and separate gear boxes incorporated with devices for regulating body-support mounting angles of the respective mono-wing type of rotary wing assembly 16, 16', 16'' and 16'''. Then a pair of mono-wing type of rotary wing assemblies on the respective side of the airborne vehicle body H rotate respectively in the directions shown by dotted arrows in a symmetrical manner, and as shown in the preceding description the tent-like wing surface of said mono-wing type of rotary wing assemblies would flap from up to down on their y, y', y" and y"' sides respectively while keeping their forwardly tilting attitude, whereupon the air is fanned out by said surfaces in the obliquely backward and downward directions on both sides of the vehicle body H, resulting in an advancing and floating effect of the airborne vehicle H as a reaction effect thereof. In this case, the reaction effects acting in the inward directions respectively as reactions of fanning out the air in the outward directions respectively by means of a pair of mono-wing type of rotary wing assemblies on both sides of the vehicle body H, would offset each other, and consequently only the advancing and floating effects would remain.

Then if the rotation speed of the mono-wing type of rotary wing assemblies equipped on both sides and both in the front and rear portions of the vehicle body is so increased that the buoyancy due to the resultant advancing and floating effect of said mono-wing type of rotary wing assemblies exceeds the weight of the vehicle body H, the vehicle body H will rise while advancing. If the rotation speed of said rotary wing assemblies are adjusted so that the buoyancy due to the resultant advancing and floating effect of said mono-wing type of rotary wing assemblies may become equal to the weight of the vehicle body H, the airborne vehicle body H will make a horizontal flight while keeping the same altitude. If the rotation speed of said mono-wing type of rotary wing assemblies is so lowered that the buoyancy due to the resultant advancing and floating effect of said rotary wing assemblies cannot bear the weight of the vehicle body H, the vehicle body H will descend while advancing.

How the variation of the tilting angle of the wing surface according to the present invention is reasonable for generating an advancing and floating effect, may become obvious by comparing the operation with the operation of the wings of a bee as shown in FIGURES 12A, 12B and 13A–C. The basic reasons why the air fanning effects of the wings in the respective cases are caused similarly, is because the periodic variation of the tilting angle of the tent-like wing surface in the case of said mono-wing type of rotary wing assembly is carried out by means of the tractive rod and the following rod which respectively correspond to the principal axis and the vein of the wing of a bee. A tent-like wing surface stretched between two supporting rods as in the both cases commonly has a feature that upon flapping down to fanning out the air the wing surface bends in an upwardly convex state, which is advantageous for fanning down the air, due to the reaction force of the air itself, and that upon flapping up so as to avoid the resistance of the air the wing surface is formed into an attitude which is directed along the flow of the air. This feature becomes the very basis for why the mono-wing type of the rotary wing assembly according to the present invention can realize a highly efficient and ample flying effect of the insect wing itself.

Now comparing the operations in both cases with reference to side views, FIG. 13A shows the wing surface attitude of a mono-wing type of rotary wing assembly when it fans out the air most strongly in the backward and downward oblique direction on the side of flapping down, FIG. 13B shows the tilted wing surface attitude of the same rotary wing assembly when it avoids the resistance of the air to the maximum extent on the side of flapping up, and FIG. 13C shows the wing surface attitudes of the wing of a bee at the above-referred states. Thus the operations of the wings of the both result in exactly the same flying effect at the wing surface positions where the strongest buoyancy is generated and where the air resistance is made minimum when the wings flap up and down.

As described, since the flying principle of the airborne vehicle equipped with the mono-wing type of rotary wing assembly according to the present invention, is based on the advancing and floating effect generated as a reaction effect of fanning out the air in the backward and downward oblique direction upon flapping down a forwardly tilting wing, there exists substantially no resistance for the air in front, and consequently all the reactions may be utilized as buoyancy. Thus the flying system according to the present invention is basically different in its flying principle from the flying system of the fixed wing airplanes in the prior art which intend to generate a buoyancy by urging a wing having an angle of elevation, which results in a large resistance for the air, onto the air by means of a propelling force.

More particularly, in the former case all the forces result in a forward speed owing to the fact that the flapping down operation of the wing is the forward and downward slipping of the air, whereas in the latter case the wing surface having a large angle of elevation is forced onto the air as it is subjected to the resistance of the air. This is no more than the flying principle of the kite. Thus the former and the latter result in a distinctive difference in speed. It is known that if the body lengths of an insect and a fixed wing airplane are converted into the same scale, and if the distances to be flown within the same period of time are calculated, the subjective speed is the highest for the insect and the lowest for the fixed wing airplanes at present, as clarified by bio-physicists and aero-physicists. It is promised from a standpoint of aerodynamics that the airborne vehicles utilizing the mono-wing type of rotary wing assembly which flies according to the principle of the wing of an insect can realize such a high speed that it cannot be expected on the basis of the common sense about the airplanes in the prior art. In addition, the piloting for slowly turning the direction, rising or descending of the above-described airborne vehicle during its high speed motion may be carried out by means of a rudder and an elevator at the rear end of the vehicle body as in the case of the fixed wing airplane in the prior art.

Figure 14:
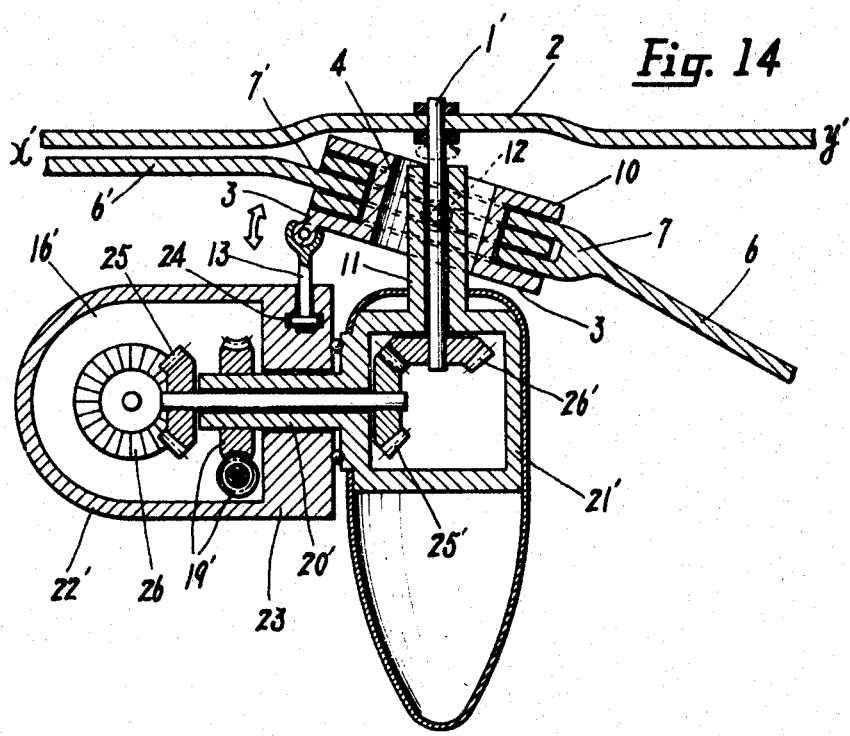

When the inner diameter of the fitting bore 4 of the annularly recessed tilted bearing body 3 having a perfect circular periphery rather than being a cam is enlarged so that the bore may fit around the bearing tube 11 of the principal rotary shaft 11 with room remaining there between as shown in FIG. 5, and when the annularly recessed tilted bearing body 3 is arranged so that it may be rocked around supporting shafts 12, 12' projecting on both sides of said bearing tube 11 by means of a lever 13 which is coupled to any suitable tilting angle regulating means, it is possible to arbitrarily change the angle of sweepback of the idle following rods 6, 6' with respect to the rotation plane of the rotary tractive rod. For instance, in case that the angles of sweepback of the idle following rods 6, 6' on the respective sides with respect to the rotation plane of the rotary tractive rod are made equal to each other, the assembly is kept in a propeller-like state where the resistance to the air is uniform over the rotation plane. Furthermore, when a power transmission gear box 21' containing a bearing tube 20' associated with a body-support mounting angle changing device 19' is provided behind the bearing tube 11 of the mono-wing type of rotary wing assembly having the above-mentioned mechanism equipped therein as shown in FIG. 14, and when after said bearing tube 20' has been rotatably coupled to a side wall 23 of the body-support 22', the projecting shaft at the extreme end of the idle following rod tilting angle regulating lever 12 which is coupled to the bottom portion of the annularly recessed tilted bearing body 3, is coupled by fitting to a cam mechanism as shown at 24 in each of FIGS. 15 to 16 which is provided on the side wall 23 of the body-support 22', it is possible to tilt said rotary wing assembly from its forward attitude as shown in FIG. 15A to its upward attitude as shown in FIG. 16A by adjusting the body-support mounting angle regulating device 20' of the mono-wing type of rotary wing assembly, and also to make the angles of sweepback of the idle following rods 6, 6' with respect to the rotation plane of said mono-wing type of rotary wing assembly symmetric on the respective sides. In addition, by adjusting the mechanism of the cam 24, it is also possible to make said mono-wing type of rotary wing assembly retain the same state while it tilts from its upward attitude to its backwardly tilted position. Thus upon flying-off the respective mono-wing type of rotary wing assemblies are made to take an upward attitude as shown in FIG. 16A and utilized just in the same way as the horizontal rotary wings of a helicopter, and as rising said mono-wing type of rotary wing assembly is tilted forwardly as shown in FIG. 15A so that the uniform buoyancy of the mono-wing type of rotary wing assembly during its initial horizontal rotation period may be gradually transferred to the y-side of the mono-wing type of rotary wing assembly where the wing rotates from up to down, and therefore the transfer from the vertical flying-off and rising state in FIG. 17B to the horizontal flying state in FIG. 17A may be carried out with safety and certainty without reducing the buoyancy. Also by carrying out a series of operations which are opposite in sequence to the described ones, the transfer from the horizontal flying state in FIG. 17A to the vertical descending and landing state in FIGURE 17B may be achieved with safety and certainty. In addition, the backward flight in the air may be carried out according to the helicopter system while backwardly tilting the mono-wing type of rotary wing assembly as shown in FIG. 17C.

The piloting operation with respect to the three axial directions during the period when the above-described airborne vehicle is stopping in the air, is carried out keeping the respective mono-wing type of rotary wing assemblies in their upward attitudes, in principle, as follows. The control for the rolling of the vehicle body is achieved by regulating the rotation speeds of the mono-wing type of rotary wing assemblies on the respective sides of the body to change the buoyancies caused by the rotary wing assemblies on the respective sides of the body. The control for the yawing of the vehicle body is achieved by tilting the rotation planes of the mono-type of rotary wing assemblies in the front and back portions of the body H in the directions opposite to each other to make the sidewise propelling directions of the rotary wing assemblies on the respective sides of the body oppose each other. The control for the pitching of the vehicle body is achieved by regulating the rotation speed of the mono-wing type of rotary wing assemblies relatively between the front and rear assemblies to relatively change the buoyancies caused by the mono-wing type of rotary wing assemblies at the front and rear portions of the body H. In addition, the slow-turning of direction, rising and descending of the above-described airborne vehicle H during its horizontal flight may be achieved by means of a rudder, elevator and the like provided at the rear portion of the vehicle body H just as in the case of the fixed wing airplane in the prior art. However, when it is required to carry out these operations quickly, they are carried out in the following manner by regulating the respective speed change gears in the power transmission gear boxes 15, 15', 15", and 15''' and the body-support mounting angle regulating devices 20, 20', 20", and 20''' for the respective mono-wing type of rotary wing assemblies in FIG. 8, so as to change the amount of the buoyancy and the direction of the propelling force of each mono-type of rotary wing assembly. That is, when it is required to turn the direction quickly, by increasing the rotation speed of the mono-wing type of rotary wing assemblies at the front and rear portions on one side of the vehicle body H as shown in FIG. 18A to make the advancing and floating forces of said mono-type of rotary wing assemblies act stronger than those on the other side, the vehicle body H may turn quickly in the direction shown by the curved arrow while it tilts to the side of reduced advancing and floating force. When it is required to rise quickly, by increasing the rotation speed of the mono-wing type of rotary wing assemblies at the front portion on both sides of the vehicle body H as shown in FIG. 18B to make the advancing and floating forces of said mono-wing type of rotary wing assemblies act stronger than those of the mono-wing type of rotary wing assemblies at the rear portion on both sides of the vehicle body H, the front portion of the vehicle body H is directed upwardly and quickly rises as drawing the rear portion of the body H. Still further when it is required to descend quickly, by decreasing the rotation speed of the mono-wing type of rotary wing assemblies at the front portion on both sides of the vehicle body H to weaken the advancing and floating force at the front portion of the body H and also by turning the rotation plane of the mono-wing type of rotary wing assemblies at the rear portion on both sides of the vehicle body H somewhat upwardly to reduce the advancing force of the last mentioned rotary wing assemblies, the front portion of the vehicle body H is directed downwardly and thus quickly descends as drawing the rear portion of the body H.

The next showing is a method for mounting on the vehicle body another combination of the mono-wing type of rotary wing assemblies, in which two sets of the mono-wing type of rotary wing assemblies, as shown in FIGURE 1, are mounted through bearings on the body supports 22, 22' in such manner that the pitch variation of the tent-like wing surfaces 8, 8' and 8", 8''' of the respective mono-wing type of rotary wing assemblies may be carried out in an opposed relation with the same period, and in case that both mono-wing type of rotary wing assemblies are equally rotated in an opposed relation, the respective advancing forces associated with buoyancies indicated by small arrows which are generated on the y-side, i.e., the side of the tent-like wing surfaces 8, 8" of the respective mono-wing type of rotary wing assemblies, are offset to each other in an opposed relation, and consequently only the buoyancies of both assemblies remains. However, these buoyancies are especially strong on the y-side, that is, in the direction of the outer periphery of revolution of the tent-like wing surfaces 8, 8" of both mono-wings of the rotary wing assemblies, so that naturally both mono-wings of the rotary wing assemblies making opposed rotation are subjected to the strong reaction effect of the y-side buoyancies, and advance in flight in the direction of the arrow P. In other words, the mono-wing type of rotary wing assemblies shown in FIGURE 1, can make a flight in the sidewise direction by making them rotate in an opposed relation. Furthermore, in case that the above-described opposed mono-wing type of rotary wing assemblies are utilized on an airborne vehicle body, in view of the necessity of perfectly synchronizing the rotation of both mono-wings of rotary wing assemblies, it is more convenient that the principal rotary shafts 1, 1 of both mono-wings of rotary wing assemblies are formed in common, as shown in FIGURE 20C. Still further, in order to make the tilting direction of the resultant propelling force generated by both these mono-wings of rotary wing assemblies freely adjustable, it is necessary to change the tilting directions of the annular recess portions 5, 5' of the annularly recessed tilted bearing bodies 3, 3' which control the pitch variation of the tent-like wing surfaces 8, 8', 8", 8''' of both mono-wings of rotary wing assemblies, and also it is essential that the respective annularly recessed tilted bearing bodies 3, 3' of both mono-wings of rotary wing assemblies are fixedly set around the bearing tubes 11 having a body support mounting angle regulating device 19 which may be freely rotated on the body support 22.

The above-described opposed mono-wings of rotary wing assemblies which comprise the principal rotary shaft 1 in common and rotate synchronously in an opposed relation, as shown in FIGURE 20C, afford substantially the same function and advantage regardless of whether the distance between the opposing rotary tractive rods 2, 2' is extremely shortened or extremely separated. Therefore, by making said opposed mono-wing type of rotary wing assemblies closely approach to each other, forming the oppositely and cooperatively rotating rotary tractive rods 2, 2' of both mono-wings of rotary wing assemblies in common, and thus uniting said opposed mono-wing type of rotary wing assemblies, as shown in FIGURE 20D, the assemblies may be constructed in a very compact form. In this case also the same function and advantage, just as described with reference to each of FIGURES 20A and 20C, and similarly the vehicle body advances in flight in the direction of the arrow P. In other words, the twin type of rotary wing assembly shown in FIGURE 20, demonstrates one technical method for arranging the mono-wing type of rotary wing assemblies shown in FIGURE 1 in an approached and opposed relation in view of their utilization.

Now as one example of the case of utilizing said mono-wing type of rotary wing assemblies in combination in a twin type, in case that two sets of twin type of rotary wing assemblies, as shown in FIGURE 20D, are mounted at the front and rear portions of the vehicle body H' in such manner that the tent-like wing surfaces 8, 8'' of said twin type of rotary wing assemblies, are most widely extended at the positions y, y' respectively, which are above the principal rotary shafts 1, 1' as shown in FIGURES 21 and 22, the torques generated by the prime motors 14, 14', 14'' and 14''' in FIG. 21 are transmitted to the principal rotary shafts of the respective twin type of rotary wing assemblies by the intermediary of the gear boxes 15, 15', 15'' and 15''' containing speed change gears and the gear boxes 16, 16', 16'' and 16''' associated with body-support mounting angle regulating device of said twin type of rotary wing assemblies, thus resulting in the rotation of the respective twin type of rotary wing assemblies equally in the directions of the dotted arrows, and consequently the twin type of tent-like wing surfaces 8, 8' and 8'', 8''' which are associated commonly with the rotary tractive rod 2, afford the same function and advantage as described in connection with the examples of the combined mono-wing type of rotary wing assemblies with reference to FIGURES 20A, 20C and 20D, and consequently the respective twin type of rotary wing assemblies make a flight in the direction of the heavy solid line arrow P in FIGURE 22 with a strong advancing buoyancy. Furthermore, in this case, the variation of the opposed tilting angle of the tent-like wing surfaces of the respective twin-type of rotary wing assemblies, is also carried out in an opposed relation similarly to the case of the mono-wing type of rotary wing assembly, as shown in FIGURE 1.

Still further when the rotary tractive rod 2 of each of the twin type of rotary wing assembly is made so as to have a streamline shape cross-section, and rotatable pipes are borne by the rear portion of the rotary tractive rod and the respective idle following rods 6, 6', 6'' and 6''' with tent-like wing surfaces 8, 8', 8'' and 8''' stretched between said pipes, the coupling portions of the tent-like wing surfaces coupled to the respective supporting rods 6, 2, 6'' and 6', 2, 6''' form means respectively, and therefore the periodic variation of the tilting angle of said tent-like wing surface may be carried out smoothly even during nay high speed of rotation, and the coupling portions of the tent-like wing surfaces coupled to the supporting rods would not be damaged as is otherwise expected.

Thus the operation for extension of the tent-like wing surfaces from their folded state to their U-shape wing state caused by the synchronous variation of tilting angles of the opposed tent-like wing surfaces during the period of rotation, of the twin type of rotary wing assembly, also has a nature which is common to the operation of fanning the air by the wide insect wings. Comparing these with each other with reference to the drawing, FIG. 24A is a perspective view which compares the opened states of the rear wings of a grasshopper and of the wings of the twin type of rotary wing assembly when the buoyancy is generated most strongly during the flapping down operation of the both wings. Comparing the angular variation of the both wings during the period by means of a side view, it is shown in FIG. 24C. In more particular, viewing the angular variation of the twin type of rotary wing assembly from its rear side, in the rotational positions 1', 2', 3', 4', and 5' in the side view, the rotary wing assembly carries out the angular variation as shown in the respective lower positions at 1'', 2'', 3'', 4'' and 5'', and it is seen that the wings of the grasshopper and the wings of the rotary wing assembly are both carrying out exactly the same air fanning operation at the upper half positions during the flapping down period, 1, 2, 3 and 1', 2', 3' respectively, where the buoyancy is generated most strongly.

Thus the airborne vehicles equipped with the twin type of rotary wing assemblies in a vertically cascaded relation, would fly while being supported at the front and rear portions thereof by the reaction of two air pressures generated by the flapping down motion of the V-shaped wing surface of said rotary wing assemblies, and therefore the stability in the air of said airborne vehicle is assured in every directions independently of the advancing speed. In this connection, the two equal reaction effects generated when the air is fanned in the both backward and downward oblique directions by the respective surface of the V-shaped wing, would give to the vehicle body H a very excellent straight forward directionality. When the rotation speeds of the twin type of rotary wing assemblies at the front and rear portions of the vehicle body H are regulated together to change the resultant advancing and floating force of the both rotary wing assemblies, if the buoyancy of the advancing and floating force acts stronger than the weight of the vehicle body H, the vehicle body H will rise while advancing; if said buoyancy is equal to the weight, the vehicle body H will carry out a horizontal flight keeping the same altitude; and if said buoyancy is not sufficient to support the weight, the vehicle body H will descend while advancing.

In the case of another arrangement as shown in FIG. 25, where the principal rotary shaft 1 on both sides of the rotary tractive rod 2 is extended, the opposite ends of said principal rotary shafts 1, 1' being borne in an opposed manner by means of bearing tubes 11, 11' having annularly recessed tilted bearing bodies 3, 3' associated with body-support mounting angle regulating devices 19, 19', any suitable power transmission gears 25, 25' being provided at the opposite end portions of said extended principal rotary shaft, any suitable positions of the bearing tubes 11, 11' being rotatably coupled to the tip portions of supports 22, 22' having an annular body coupling device 27 at their base end portions, and the torques generated by the prime motors 14 and 14' associated with speed change gears which are provided at the lower portions of said support, are transmitted to gears 25, 25' provided at the tip portions of the above-described extended principal rotary shafts 1, 1' through gears 26, 26' at the tip portions of rotation transmission shafts 28, 28' of the respective supports 22, 22'; it is possible to shift the position where the angles of sweepback of the idle following rods 6, 6'' on the respective side with respect to the rotation plane of the rotary tractive rod 2 are opened at the maximum, by changing the tilting angle of the annular recess portions 5, 5' of said annularly recessed tilted bearing bodies 3, 3' through the step of rotating said tilted bearing bodies 3, 3' in the direction shown by a framed line arrow by regulating the body-support mounting angle regulating device 19 for the respective bearing tubes 11, 11' on both sides of the rotary tractive rod 2, while rotating the twin type of rotary wing assembly.

An airborne vehicle H equipped with twin type of rotary wing assemblies having the above described arrangement at the front and rear portions thereof in a vertically cascaded relation, can carry out forward, vertical and backward flight by changing the direction of the longitudal buoyancy of each twin type of rotary wing assembly as shown in FIG. 26 through the step of shifting vertically the position where the V-shaped wing surfaces 8, 8″ of the respective twin type of rotary wing assemblies are opened to the maximum extent. More particularly, in case that the positions y and y′ where the both surfaces of the V-shaped wing in the twin type of rotary wing assembly are opened to the maximum extent, are shifted above the principal rotary shafts 1, 1′ respectively as shown in FIG. 26A, the air is fanned out equally in the both backward and downward oblique directions with respect to the wing surfaces as shown by the solid line arrows by means of the both surfaces of the V-shaped wing as have been already described, and due to its reaction effect the vehicle body H is straightly advanced and floated in the P-direction. Then if the rotation speeds of the respective twin type of rotary wing assemblies at the front and rear portions of the vehicle body H are regulated together to change the resultant advancing and floating force generated by the both twin type of rotary wing assemblies, when the buoyancy acts stronger than the weight of the vehicle body H, the vehicle body H will rise while advancing; when said buoyancy is equal to the weight of the vehicle body H, the vehicle body H will carry out a horizontal flight while keeping the same altitude; and when said buoyancy is not sufficient to support the weight of the vehicle body H, the vehicle body H will descend while advancing.

On the other hand, in case that the positions y and y′ where the both surfaces of the V-shaped wing in the twin type of rotary wing assembly are opened to the maximum extent, are kept at the horizontal position as shown in FIG. 26B, the air is fanned out equally in the straight downward directions with respect to said wing surfaces as shown by the solid line arrows by means of the both surfaces of the V-shaped wing, and due to its reaction effect the vehicle body H is vertically floated in the P-direction. Then also, if the rotation speed of said twin type of rotary wing assembly is raised so that the resultant buoyancy may act stronger than the weight of the vehicle body H, the vehicle body H will rise vertically; and if the rotation speed of said twin type of rotary wing assembly is regulated so that the resultant buoyancy may become equal to the weight of the vehicle body H, the vehicle body H will stop in the air. If the rotation speed of said twin type of rotary wing assembly is reduced so that the resultant buoyancy may become insufficient to support the weight of the vehicle body H, the vehicle body H will descend vertically.

Still further, in case that the positions y and y′ where the both surfaces of the V-shaped wing in the twin type of rotary wing assembly are opened to the maximum extent, are shifted below the principal rotary shafts 1, 1′, respectively as shown in FIG. 26C, the air is fanned out equally in the both forward and downward oblique directions with respect to said wing surfaces by means of the both surfaces of the V-shaped wing, and due to its reaction effect the vehicle body H carries out a backward flight in the P-direction. In this case also, it is possible to make said vehicle body H carry out a backward rising flight, backward horizontal flight and backward descending flight by regulating the rotation speed of the twin type of rotary wing assemblies at the front and back portions of the vehicle body H together so as to vary the resultant backward buoyancy.

Now with reference to the method for driving the above-mentioned airborne vehicle in the three axial directions while it stops in the air, the control for the rolling of said airborne vehicle is carried out by shifting the weight of the pilot to either side as shown in FIG. 27A, and the control for the yawing is carried out by rotating the annular vehicle body coupling devices 27, 27′ at the lower end portions of the supports which hold the twin type of rotary wing assemblies to change the direction of fanning out the air by the rotary wing assemblies at the front and rear portions of the airborne vehicle H, as shown in FIG. 27B. Further, with regard to the control for the pitching, when it is required to backwardly tilt the vehicle body H, the rotation speed of the twin type of rotary wing assembly at the rear portion of the vehicle body H is lowered while the rotation speed of the twin type of rotary wing assembly at the front portion of the vehicle body H is raised, and simultaneously the position y where the both surfaces of the V-shaped wing in the rotary wing assembly at the front portion of the vehicle body H will descend quickly while drawing the rear por- above the principal rotary shaft 1 to maintain an advancing buoyancy, as shown in FIG. 27C. Then the backward force of the twin type of rotary wing assembly at the rear portion of the vehicle body H which is generated due to the backward tilting of the vehicle body H, may be compensated, and thus the vehicle body H may transfer to its backwardly tilting attitude while it remains stopped in the air.

On the other hand, when it is required to forwardly tilt the vehicle body H, the rotation speed of the twin type of rotary wing assembly at the front portion of the vehicle body H is lowered while the rotation speed of the twin type of rotary wing assembly at the rear portion of the vehicle body H is raised, and simultaneously the position y′ where the both surfaces of the V-shaped wing in the rotary wing assembly at the rear portion of the vehicle body are opened to the maximum extent, is shifted below the principal rotary shaft 1′ to generate a backward buoyancy, as shown in FIG. 27D. Then the forward force of the twin type of rotary wing assembly at the front portion of the vehicle body H which is generated due to the forward tilting of the vehicle body H, may be compensated, and thus the vehicle body H may transfer to its forwardly tilting attitude while it remains stopped in the air.

Quick rising and quick descending of the above-described airborne vehicle during its forward flight is carried out in the following manner. That is, when it is required to rise quickly, the rotation speed of the twin type of rotary wing assembly at the front portion of the vehicle body H is raised to tilt the vehicle body H backwardly, and simultaneously the positions y and y′ where the both surfaces of the V-shaped wings in the twin type of rotary wing assemblies at the front and rear portions of the vehicle body H are opened to the maximum extent, are shifted above the principal rotary shafts 1, 1′ respectively, to retain the advancing forces of said twin type of rotary wing assemblies which are otherwise lost due to the backward tilting of the vehicle body H. Then the front portion of the vehicle body H will quickly rise while drawing the rear portion of the vehicle body H. On the other hand, when it is required to descend quickly, the rotation speed of the twin type of rotary wing assembly at the front portion of the vehicle body H is lowered to tilt the vehicle body H forwardly, and simultaneously the position y′ where the both surfaces of the V-shaped wing in the rotary wing assembly at the rear portion of the vehicle body H are opened to the maximum extent is lowered below the principal rotary shaft 1′ to reduce the advancing force of said twin type of rotary wing assembly which is increased due to the forward tilting of the vehicle body H. Then the front portion of the vehicle body H will descend quickly while drawing the rear portion of the vehicle body H.

In the next, when it is required to turn the direction quickly, the turning is carried out by directing the advancing direction of the twin type of rotary wing assembly at the front portion of the vehicle body H to the desired direction while shifting the weight of the pilot to the side to which he wants to turn as shown in FIG. 27A. Alternatively, if the respective positions where the wing surfaces are extended to the maximum extent are individually shifted for each surface of the V-shaped wing in the twin type of rotary wing assembly at the front portion of the vehicle body H so as to keep one surface of the V-shaped wing on the side to which the pilot wants to turn at a stopping condition and the other surface of the V-shaped wing on the opposite side at an advancing condition, by adjusting the vehicle body mounting angle regulating devices 19, 19' of the bearing bodies 11, 11' having annularly recessed tilted bearing bodies 3, 3', as shown in FIG. 25, while also shifting the weight of the pilot to the side to which he wants to turn, the vehicle body H will turn quickly because the advancing forces on the respective sides of the vehicle body H become different from each other. If all the turning operations are carried out simultaneously, the airborne vehicle according to the present invention can achieve a small radius of turning which cannot be realized by any other airplanes.

As described, the mobility in the air of the airborne vehicle utilizing a twin type of rotary wing assembly is so free and safe that it could not be expected for the airplanes in the prior art. Also the fact that the twin type of rotary wing assembly is equipped to the vehicle body in a vertically cascaded relation, means that said rotary wing assembly can rotate keeping the most narrow state with respect to the footing, and therefore, the above-described airborne vehicle can fly off or land on the land of any shape so long as a footing exists.

Reviewing the basic features of the above-described twin type of rotary wing assembly as described with reference to each of FIGURES 20A, 20B, 20C and 20D, it utilizes as an advancing buoyancy the reaction effect of the air fanning out effect produced from below the side surface to below the back half surface of a mono-wing type of rotary wing assembly when it is rotated solely. Depending upon the selection whether the reaction effect of the air fanning effect in the downward direction from the back half surface of said rotary wing assembly is mainly utilized or the reaction effect of the air fanning effect in the downward direction from the side surface of said rotary wing assembly is mainly utilized, the combination of the rotary wing assemblies equipped on an airborne vehicle body differs. Both the airborne vehicle employing a mono-wing type of rotary wing assembly and the airborne vehicle employing a twin type of rotary wing assembly are essentially based on the exactly same mechanism and fly according to the exactly same floating principle. Since the rotary wing assembly according to the present invention employs a flexible or semi-hard tent-like wing surface for its wing surface, it has a characteristic feature that while the wing surface rotates as being drawn when it flaps down the air it bends in an upwardly convex shape, and when it flaps up while avoiding the resistance of the air it deforms to have a wing surface cross-section shape which follows to the air flow. In addition, in the mechanism for giving a tilting angle to such a specific tent-like wing surface, there exists no cam, gear, rod, spring and the like which results in a frictional reaction and frictional resistance. Furthermore, the method for varying the tilting angle of the tent-like wing surface is not relying upon a control operation using a torque around the shaft as is the case of the variable pitch system in the prior art, but instead relying upon a special system in which the following angle of a tent-like wing surface is controlled through following rods which can idle freely quite independently upon the torque around the rotary shaft. Therefore, when the rotary wing assembly is rotated at a high speed while periodically varying the tilting angle of the tent-like wing surface, there exists no frictional reaction and mechanical resistance at all which acts against the torque, and thus the power of the employed prime motor can be concentrated only to the force for flapping the air, so that a strong floating effect due to very high speed of rotation may be realized.

Consequently, the wing surface area of the rotary wing assembly according to the present invention, is only hundredths of that of the airplane wing in the prior art. Thus the huge wings seen in the airplanes in the prior art which are very inconvenient for flying off and landing, will become quite unnecessary. Furthermore, since the flying action of the airplanes in the prior art is obtained, as previously described, as a result of opposite effects of advancing force and resistive force of the wing with respect to the air, the prior art airplane had a fatal defect that a slight unbalance between these effects such as, for instance, a slight stall during a rising period would result in zero buoyancy which at once causes a fall accident. However, since the airborne vehicle utilizing the rotary wing assembly according to the present invention, would advance and float on the basis of the reaction effect of opposite storm-like air pressures, which are caused by the flapping motion of the rotary wing assembly, the buoyancy may be always maintained independently upon the advancing speed, and therefore a fall accident due to stall which was a fatal defect of the prior art airplane, would never occur. Furthermore, the stability of the vehicle body in the air, which is maintained on the basis of the reaction effect of storm-like air pressure generated by itself, is so complete that the stability would not be lost unless a sudden gust of wind in the traverse direction, which is strong enough to offset the storm-like air pressure, blows. Even if it should be brought into an unstable attitude, it would at once restore the original stable attitude so long as it remains floating on the basis of the reaction effect of two storm-like air pressures. In addition, since the method of obtaining a buoyancy on the basis of a reaction effect of fanning the air on the side from up to down by means of the rotary wing assembly, results in the floating up effect by scratching the air on the side of the wing, the rotary wing assembly according to the present invention is little affected by the abruptly changing land surface condition which made the operation and adjustment very difficult upon the flying off and landing of the airplane in the prior art. Thus the place for flying off or landing may be selected at any place so far as a footing exists, even at an inclined land with any distinctive unevenness, and even at a place having any step.

As described, the rotary wing assembly according to the present invention is very simple in its mechanical structure and does not require precise machining, and also the flight system using this rotary wing assembly is a reasonable one from a view point of aerodynamics. Therefore, its manufacture is very simple, and the motional performance of the airborne vehicle employing the rotary wing assembly according to the present invention has an aerodynamical feature that it can freely and properly move around in any narrow space. Thus it has a characteristic feature which contributes distinctively to the human being by giving a method for resolving the unsoluble problems with regard to town traffic in the world which has become a very fearful status.

What I claim is:

1. A rotary wing assembly comprising a principal rotary shaft, a rotary tractive rod fixedly secured to said principal rotary shaft for making a uniform angular motion, an annularly recessed tilted bearing body of substantially cylindrical shape with annular recesses provided on its cylindrical surface and having its tilted bore smoothly fitted around said principal idle shaft, rotary following rods rotatably carried from said annularly recessed bearing body with its ring portion at one end fitted around the annular recess of said bearing body so as to periodically vary their tilting angle with respect to the rotation plane of said rotary tractive rod, and tent-like wing surfaces stretched between said rotary tractive rod and the respective idle following rods, whereby the idle following rods may make an accelerated angular motion in accordance with the rotation of said rotary tractive rod, while periodically varying the tilting angle of said wing surface as they are drawn by said rotary tractive rod via said tent-like wing surfaces.

2. A rotary wing assembly comprising a principal rotary shaft, a rotary tractive rod fixedly secured to said principal rotary shaft for making a uniform angular motion, a bearing tube having its bore smoothly fitted around said principal rotary shaft, an annularly recessed tilted bearing body of substantially cylindrical shape with annular recesses provided on its cylindrical surface, coupled to said bearing tube so as to be rocked freely with a room remained therebetween, idle following rods rotatably carried from said annularly recessed tilted bearing body with its ring portion at one end fitted around the annular recess of said bearing body so as to periodically vary their tilting angle with respect to the rotation plane of said rotary tractive rod, and tent-like wing surfaces stretched between said rotary tractive rod and the respective idle following rods, whereby the idle following rods may make an accelerated angular motion in accordance with the rotation of said rotary tractive rod, while periodically varying the tilting angle of said wing surface as they are drawn by said rotary tractive rod via said tent-like wing surfaces.

3. A rotary wing assembly comprising a principal rotary shaft, a rotary tractive rod fixedly secured to said principal rotary shaft for making a uniform angular motion, a bearing tube having its bore smoothly fitted around said principal rotary shaft, an annularly recessed tilted bearing body of substantially cylindrical shape with annular recesses provided on its cylindrical surface, coupled to said bearing tube so as to be rocked freely with a room remained therebetween, idle following rods rotatably carried from said annularly recessed tilted bearing body with its ring portion at one end fitted around the annular recess of said bearing body so as to periodically vary their tilting angle with respect to the rotation plane of said rotary tractive rod, tent-like wing surfaces stretched between said rotary tractive rod and the respective idle following rods whereby the idle following rods may make an accelerated angular motion in accordance with the rotation of said rotary tractive rod while periodically varying the tilting angle of said wing surface as they are drawn by said rotary tractive rod via said tent-like wing surfaces, and a power transmission gear box for said principal rotary shaft provided at the lower end portion of said bearing tube for said principal rotary shaft, said gear box having on its side at a right angle a bearing tube associated with a body mounting angle regulating device for carrying a power transmission shaft, said bearing tube associated with a body mounting angle regulating device being rotatably and adjustably mounted on a side wall of a body-support.

4. A rotary wing assembly comprising a principal rotary shaft, a rotary tractive rod fixedly secured to said principal rotary shaft for making a uniform angular motion, a bearing tube having its bore smoothly fitted around said principal rotary shaft, an annularly recessed tilted bearing body of substantially cylindrical shape with annular recesses provided on its cylindrical surface, coupled to said bearing tube so as to be rocked freely with a room remained therebetween, idle following rods rotatably carried from said annularly recessed tilted bearing body with its ring portion at one end fitted around the annular recess of said bearing body so as to periodically vary their tilting angle with respect to the rotation plane of said rotary tractive rod, tent-like wing surfaces stretched between said idle tractive rod and the respective rotary following rods whereby the idle following rods may make an accelerated angular motion in accordance with the rotation of said rotary tractive rod while periodically varying the tilting angle of said wing surface as they are drawn by said rotary tractive rod via said tent-like wing surfaces, and a power transmission gear box for said principal rotary shaft provided at the lower end portion of said bearing tube for said principal rotary shaft, said gear box having on its side at a right angle a bearing tube associated with a body mounting angle regulating device for carrying a power transmission shaft, said bearing tube associated with a body mounting angle regulating device being rotatably and adjustably mounted on a side wall of a body-support having cam means, said cam means provided in the side wall of said body-support being coupled to a tip portion of an idle following rod tilting angle regulating lever provided at said annularly recessed tilted bearing body.

5. A rotary wing assembly consisting of two sub-assemblies arranged in a symmetric relation with a common rotary tractive rod positioned on the center plane, each sub-assembly comprising a principal rotary shaft, a rotary tractive rod which is common to said both sub-assemblies and fixedly secured to said principal rotary shaft for making a uniform angular motion, an annularly recessed tilted bearing body of substantially cylindrical shape with annular recesses provided on its cylindrical surface, having its tilted bore smoothly fitted around said principal rotary shaft, idle following rods rotatably carried from said annularly recessed bearing body with its ring portion at one end fitted around the annular recess of said bearing body so as to periodically vary their tilting angle with respect to the rotation plane of said rotary tractive rod, and tent-like wing surfaces stretched between said rotary tractive rod and the respective idle following rods, whereby the idle following rods may make an accelerated angular motion in accordance with the rotation of said rotary tractive rod, while periodically varying the tilting angle of said wing surface as they are drawn by said rotary tractive rod via said tent-like wing surfaces.

6. A rotary wing assembly consisting of two sub-assemblies arranged in a symmetric relation with a common rotary tractive rod positioned on the center plane, each sub-assembly comprising a principal rotary shaft for making a uniform angular motion, a rotary tractive rod which is common to said both sub-assemblies and fixedly secured to said principal rotary shaft, an annularly recessed tilted bearing body of substantially cylindrical shape with annular recesses provided on its cylindrical surface, having its tilted bore smoothly fitted around said principal rotary shaft, idle following rods rotatably carried from said annularly recessed bearing body with its ring portion at one end fitted around the annular recess of said bearing body so as to periodically vary their tilting angle with respect to the rotation plane of said rotary tractive rod, and tent-like wing surfaces stretched between said rotary tractive rod and the respective idle following rods, whereby the idle following rods may make an accelerated angular motion in accordance with the rotation of said rotary tractive rod, while periodically varying the tilting angle of said wing surface as they are drawn by said rotary tractive rod via said tent-like wing surfaces, a bearing tube at the base portion of said tilted bearing body associated with a body-support mounting angle regulating device being rotatably and adjustably mounted at its any suitable portion onto the tip portions of a pair of supports provided on a vehicle body, said bearing tube symmetrically bearing the opposite ends of the principal rotary shaft of said rotary tractive rod, the opposite end portions of said principal rotary shaft being coupled to any suitable rotating power transmission shaft.

7. A rotary wing assembly consisting of two sub-assemblies arranged in a symmetric relation with a common rotary tractive rod positioned on the center plane, each sub-assembly comprising a principal rotary shaft, a rotary tractive rod which is common to said both sub-assemblies and fixedly secured to said principal rotary shaft for making a uniform angular motion, an annularly recessed tilted bearing body of substantially cylindrical shape with annular recesses provided on its cylindrical surfaces, having its tilted bore smoothly fitted around said principal rotary shaft, idle following rods rotatably carried from said annularly recessed bearing body with its ring portion at one end fitted around the annular recess of said bearing body so as to periodically vary their tilting angle with respect to the rotation plane of said rotary tractive rod, and tent-like wing surfaces stretched between said rotary tractive rod and the respective idle following rods, whereby the idle following rods may make an accelerated angular motion in accordance with the rotation of said rotary tractive rod, while periodically varying the tilting angle of said wing surface as they are drawn by said rotary tractive rod via said tent-like wing surfaces, a bearing tube at the base portion of said tilted bearing body associated with a body-support mounting angle regulating device being rotatably and adjustably mounted at its any suitable portion onto the tip portions of a pair of supports having an annular vehicle body coupling device at its base portion, said bearing tube symmetrically bearing the opposite ends of the principal rotary shaft of said rotary tractive rod, the opposite end portions of said principal rotary shaft being coupled to any suitable rotating power transmission shaft.

8. A rotary wing assembly, in which a principal rotary shaft (1) having a center portion of a rotary tractive rod (2) fixedly secured to its tip portion, is rotatably mounted in a penetrating bore (4) of an annularly recessed tilted bearing body (3) having a perfect circular periphery rather than being a cam; in which fitting rings (7), (7') having idle following rods (6), (6') formed at a certain angle of sweepback with respect to the center line of said annularly recessed tilted bearing body (3), are rotatably fitted around the annular recess portion (5) of said annularly recessed tilted bearing body so as to freely idle; and in which tent-like wing surfaces (8), (8') are stretched between the rotary tractive rods (2) and the idle following rods (6), (6').

9. A rotary wing assembly, in which a principal rotary shaft (1) having a center portion of a rotary tractive rod (2) fixedly secured to its tip portion, is rotatably mounted in a bearing tube (11), in which a fitting bore (4) of an annularly recessed tilted bearing body (3) having a perfect circular periphery rather than a cam and having a lever (13) coupled thereto, is fitted around the bearing tube (11) with room remaining therebetween; in which the inside wall of the fitting bore (4) of the annularly recessed tilted bearing body (3), is pivotably coupled to supporting shafts (12), (12') projecting from opposite sides of the bearing tube (11), so that the annularly recessed tilted bearing body may be rocked freely; in which fitting rings (7), (7') having idle following rods (6), (6') formed at a certain angle of sweepback with respect to the center line of said annularly recessed tilted bearing body (3), are rotatably fitted around the annular recess portion (5) of said annularly recessed tilted bearing body so as to freely idle; and in which tent-like wing surfaces (8), (8') are stretched between the rotary tractive rod (2) and the idle following rods (6), (6').

10. A rotary wing assembly, in which a principal rotary shaft (1) penetrates through and is fixedly secured to respective center portions of rotary tractive rods (2), (2') arranged in an opposite relation; in which around the principal rotary shaft (1), (1) projecting on the opposite sides of the respective rotary tractive rods (2) (2'), are rotatably fitted bearing tubes (11), (11') provided therearound with annularly recessed tilted bearing bodies (3), (3') having a perfect circular periphery rather than being a cam and formed symmetrically and equally to each other, in such manner that the respective annularly recessed tilted bearing bodies (3), (3') may oppose to each other; in which fitting rings (7), (7') and (7") having idle following rods (6), (6'), (6"), (6''') respectively formed at a certain angle of sweepback with respect to the respective center lines of said annularly recessed tilted bearing bodies (3), (3'), are rotatably fitted around the respective annular recess portion (5), (5') of said annularly recessed tilted bearing bodies (3), (3') so as to freely idle; and in which tent-like wing surfaces (8), (8'), (8"), (8''') are stretched between the respective rotary tractive rods (2), (2') and the respective idle following rods (6), (6') and (6"), (6''').

11. A rotary wing assembly, in which a principal rotary shaft (1) penetrates through and is fixedly secured to a center portion of a rotary tractive rod (2); in which around the principal rotary shaft (1), (1) on the opposite sides of the respective rotary tractive rod (2), are rotatably fitted bearing tubes (11), (11') provided therearound with annularly recessed tilted bearing bodies (3), (3') having a perfect circular periphery rather than being a cam and formed symmetrically and equally to each other in such manner that the respective annularly recessed tilted bearing bodies (3), (3') may oppose to each other; in which fitting rings (7), (7') and (7"), (7''') having idle following rods (6), (6'), (6"), (6''') respectively formed at a certain angle of sweepback with respect to the respective center lines of said annularly recessed tilted bearing bodies (3), (3'), are rotatably fitted around the respective annular recess portion (5), (5') of said annularly recessed tilted bearing bodies (3), (3') so as to freely idle; and in which tent-like wing surfaces (8), (8'), (8"), (8''') are stretched between the respective rotary tractive rods (2), (2') and the respective idle following rods (6), (6') and (6"), (6''').

References Cited by the Examiner

UNITED STATES PATENTS

| | | | |
|---|---|---|---|
| 319,758 | 6/1885 | Spier | 170—143 X |
| 979,472 | 12/1910 | Goehner | 244—20 |
| 1,035,377 | 8/1912 | Mendez | 170—153 |
| 1,053,526 | 2/1913 | Mendez | 170—154 |
| 3,008,524 | 11/1961 | Kaplan | 244—17.23 X |
| 3,181,810 | 5/1965 | Olson | 244—7 |
| 3,210,027 | 10/1965 | Culver | 244—17.23 |

FOREIGN PATENTS

| | | |
|---|---|---|
| 25,397 | 8/1906 | Austria. |
| 1,195,068 | 5/1959 | France. |

MARTIN P. SCHWADRON, *Primary Examiner.*

EVERETTE A. POWELL, JR., *Examiner.*